United States Patent [19]
Jarret

[11] Patent Number: 4,932,637
[45] Date of Patent: Jun. 12, 1990

[54] HYDROSTATICALLY COMPRESSED ELASTOMERIC SPRING AND ITS MANUFACTURING METHOD

[75] Inventor: Jacques H. Jarret, Louveciennes, France

[73] Assignee: Societe d'Exploitation des Ressorts Auto-Amortisseurs Jarret, Paris, France

[21] Appl. No.: 301,025

[22] Filed: Jan. 24, 1989

[30] Foreign Application Priority Data

Jan. 26, 1988 [FR] France ................. 88 00878

[51] Int. Cl.$^5$ ................. F16F 1/36; F16F 3/08; H01B 1/00
[52] U.S. Cl. ................. 267/148; 60/528; 252/511; 267/152; 264/314; 264/573
[58] Field of Search ........... 267/149, 136, 152, 153, 267/158, 148, 160, 30, 69; 60/528; 248/550, 571; 264/137, 236, 314, 573; 252/511

[56] References Cited

U.S. PATENT DOCUMENTS

| 4,172,590 | 10/1979 | Jarret et al. | 267/149 |
| 4,589,999 | 5/1986 | Vasta | 252/511 |
| 4,611,792 | 9/1986 | Jarret et al. | 267/149 |

FOREIGN PATENT DOCUMENTS

| 0101365 | 8/1983 | European Pat. Off. . | |
| 0197759 | 4/1986 | European Pat. Off. . | |
| 2368127 | 10/1977 | France . | |
| 399085 | 9/1965 | Switzerland | 267/158 |
| 759423 | 6/1953 | United Kingdom . | |

Primary Examiner—Robert J. Oberleitner
Attorney, Agent, or Firm—Schroeder & Siegfried

[57] ABSTRACT

A hydrostatically compressed elastomeric spring, having an S-bent tubular envelope, of flattened cross-section, filled with a mass of electrically conductive elastomer and closed by metal endpieces. By causing an electrical current to pass through the conductive elastomer, via the endpieces, the elastomer is heated up by Joule effect, thereby inducing a thermal expansion which results in a modification of the properties of the spring.

16 Claims, 2 Drawing Sheets

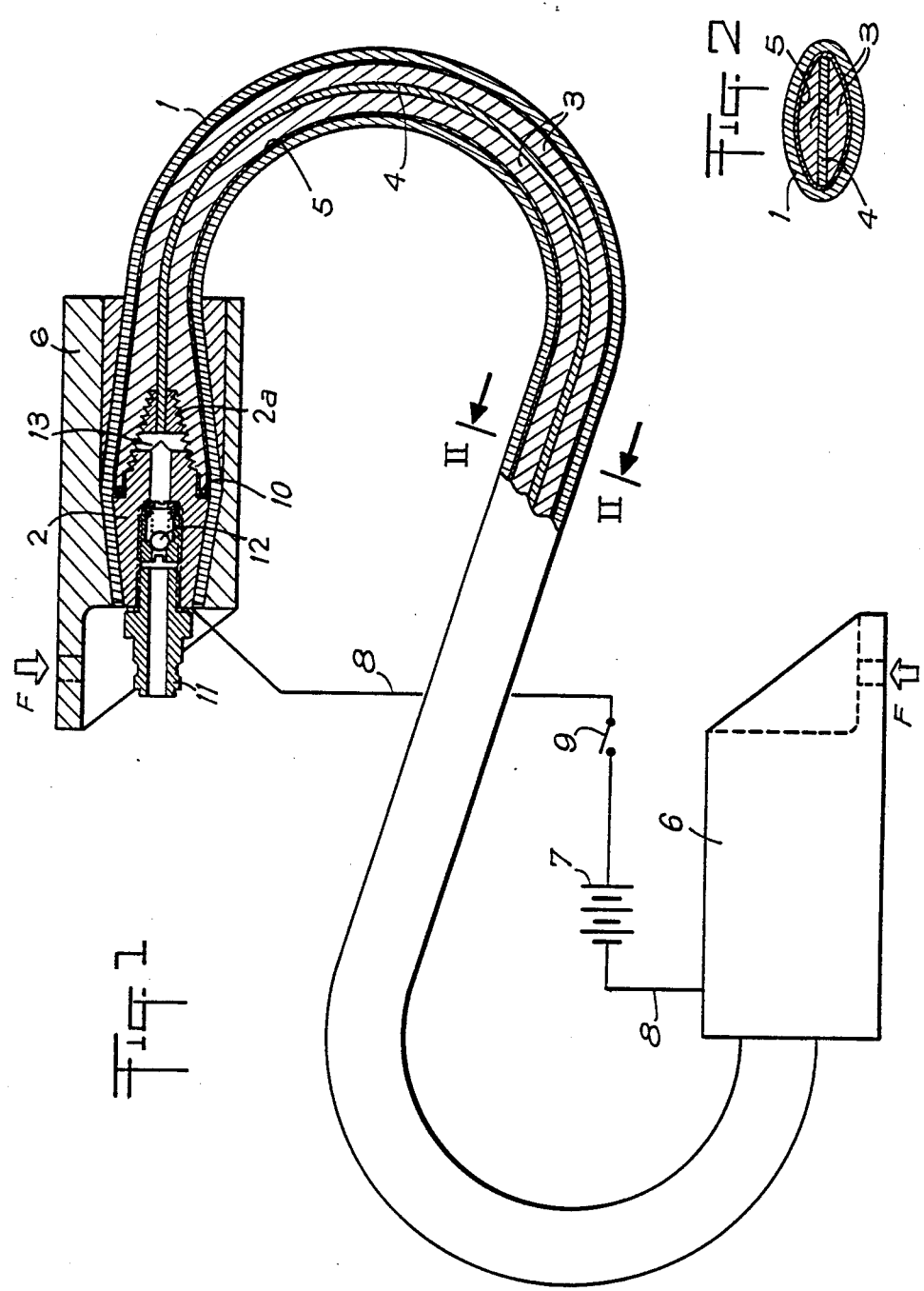

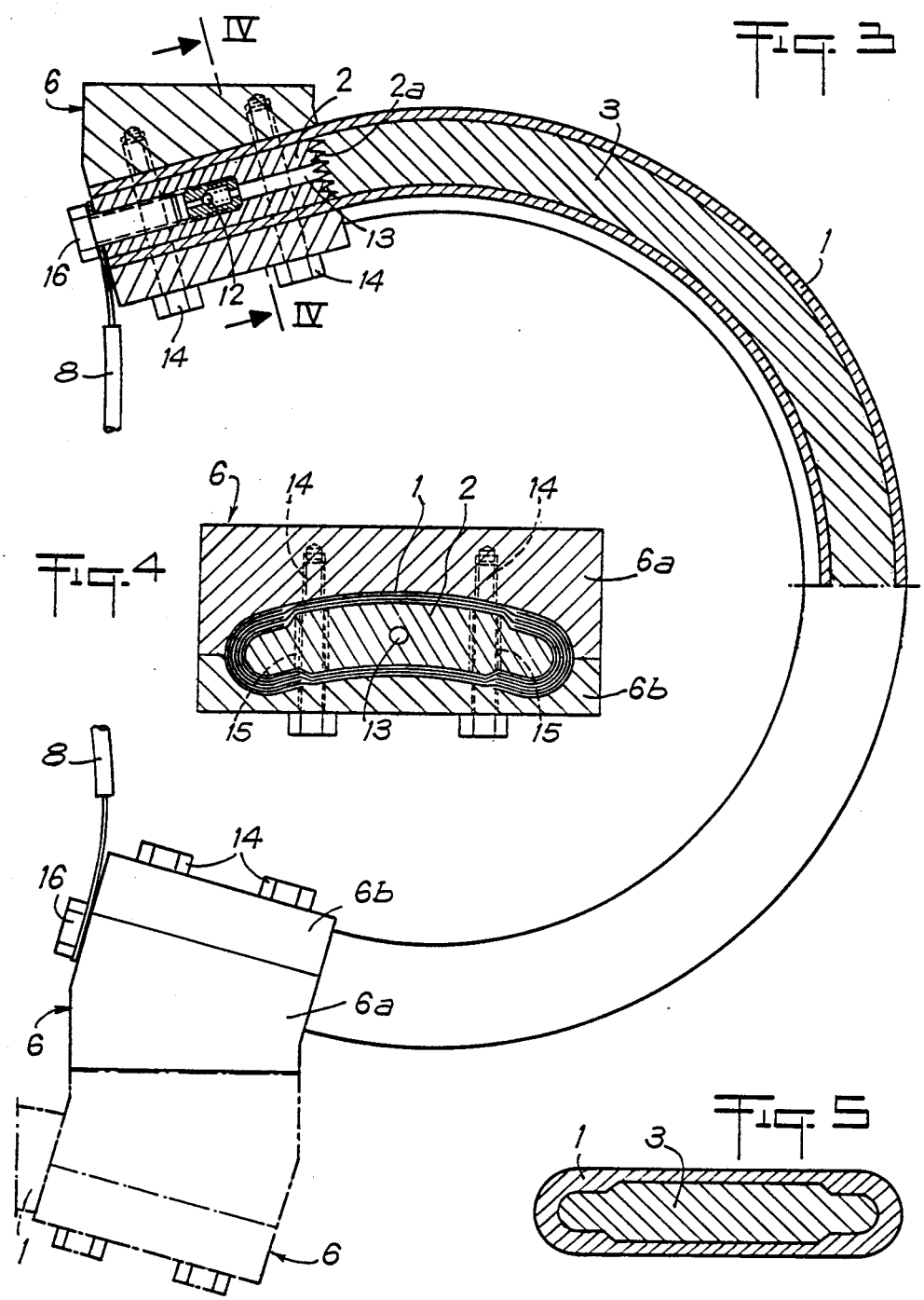

HYDROSTATICALLY COMPRESSED ELASTOMERIC SPRING AND ITS MANUFACTURING METHOD

FIELD OF THE INVENTION

The invention relates to a hydrostatically compressed elastomeric spring, constituted by a bent tubular envelope, of flattened cross-section, having a deformable and electrically insulating wall, said envelope being filled with a mass of elastomer, the volume of which can be caused to vary by thermal expansion induced by an electrical resistor which, being connected to an electrical supply source, can heat said mass by Joule effect.

BACKGROUND OF THE INVENTION

French Patent No. 82 13 475 already describes a spring of the aforesaid type, wherein said heating resistor is constituted by a metal core formed by a flexible strip embedded in the elastomer. Such a heating element presents an ohmic resistance of very low value, which has the disadvantage of requiring a current supply of very high intensity.

SUMMARY OF THE INVENTION

It is the object of the present invention to overcome this disadvantage.

To this effect, according to the invention, the electrical resistor is constituted by the elastomer mass itself, the elastomer used being electrically conductive and exhibiting a resistivity which is compatible with the required heating power and with the characteristics of the electrical supply source.

Owing to this particular disposition, the heating element—i.e. the elastomer—has a much higher omhic resistance than a metal strip, and as a result, the supply current intensity may be reduced to a low value and this, easier to produce. And moreover, an inner flexible core becomes unnecessary.

The conductive elastomer can be an initially non-conductive elastomer to which a load of conductive substance has been incorporated. In particular, a basic elastomer of siloxane type containing carbon black as conductive load, can be used.

In general, the resistivity of the conductive elastomer will be adjusted to a value ranging between 1 and 10 ohm.cm.

The spring tubular envelope is preferably closed at its ends by metal endpieces via which the mass of conductive elastomer can be connected with the electrical supply source, the face of end endpiece which is in contact with the elastomer having a rough surface texture in order to reduce the electrical junction resistance between endpiece and elastomer.

Because of its longitudinally bent shape and its flattened cross-section, the spring comprises intrados and extrados faces. Said faces are preferably constituted by portions of parallel surfaces, which are either substantially cylindrical and co-axial, or substantially spherical and concentric.

Another object of the invention is to provide a method for manufacturing a spring such as defined above, of longitudinally bent shape and flattened cross-section, constituted essentially by a deformable tubular envelope filled with elastomer and closed at its ends by metal endpieces. Said method consists in :
molding a mass of electrically conductive vulcanized elastomer into a sausage which has the bent shape required for the spring, with a flattened cross-section, and which is moreover thinner in the vicinity of the lateral edges of said sausage separating the intrados and extrados faces thereof, placing on the ends of said sausage the metal endpieces of cross-section identical to that of the sausage, forming the tubular envelope around the sausage equipped with the endpieces, by applying pre-impregnated bands of fabric alternately on the intrados and extrados faces of the sausage and of the endpieces, the lateral borders of said bands being folded over on said lateral edges in such a way as to cover them closely, and in baking in a mold the impregnation product of the resulting envelope, placing mechanical connection sleeves around the ends of the envelope covering the endpieces, and if necessary, adding a complement of elastomer or of any other appropriate product by injection into the envelope through one of the endpieces.

The above-described method is applicable to the production of a spring having no central core. In the other case, namely when the spring tubular envelope is required to contain, in addition to the elastomer, a flat bent-shaped central core produced from an electrically insulating flexible material, and which extends longitudinally from one metal endpiece to the other while being fixed by its ends to said endpieces, and transversely through the whole length of the big axis of the flattened, substantially elliptical section of said envelope, it is possible to proceed as follows :

by fitting a tight and deformable tubular casing over the core, fixing the endpieces to the ends of the core, and connecting said endpieces in fluid-tight manner to the tubular casing, fitting the tubular envelope made of braided fibers over said casing, the ends of said envelope respectively covering over the endpieces, positioning the mechanical connection sleeves which clamp the ends of the tubular envelope on the endpieces, placing the whole assembly in a mold, inflating the tubular casing via a conduit formed through one of the endpieces and impregnating the wall of the tubular envelope with an impregnation product which is introduced through the wall of the mold and undergoes a baking treatment, injecting a filling mass of electrically conductive elastomer into the tubular casing via said conduit, and optionally vulcanizing the elastomer filling the tubular casing.

Said casing-inflating operation is performed either by blowing in an auxiliary compressor air, or by injecting the actual filling elastomer.

BRIEF DESCRIPTION OF THE DRAWINGS

The invention will be more readily understood on reading the following description with reference to the accompanying drawings, in which :

FIG. 1 is an elevational view with partial longitudinal section, of a spring according to the invention.

FIG. 2 is a cross-section along line II—II of the object of FIG. 1,

FIG. 3 is a view showing, as in FIG. 1, another embodiment of the spring according to the invention, FIG. 4 is a cross-section along line IV—IV of the object of FIG. 3, FIG. 5 is a cross-section of a variant embodiment of the spring shown in FIG. 3.

DETAILED DESCRIPTION OF PREFERRED EMBODIMENTS

FIGS. 1 and 2 illustrate one embodiment of a hydrostatically compressed elastomeric spring, which is S-shaped and comprises a tubular envelope 1 with deformable wall, which envelope is closed at its ends by endpieces 2, one of which only is shown in FIG. 1, and filled with a mass of elastomer 3. A flat flexible core 4 extends inside the envelope, in the center thereof, from one endpiece to the other, said flexible core being rigidly fixed in said endpieces. Envelope 1 is lined on the inside with a tubular casing 5.

At each end of the spring, there is provided a mechanical connection sleeve 6 clamping the corresponding endpiece 2, via the end of envelope 1 covering over said endpiece. Each sleeve 6, which cooperates with the corresponding endpiece 2 for closing the envelope 1 in fluid-tight manner, constitutes a mechanical connection member between the spring and one of the two parts between which said spring is due to be mounted. It is through said sleeves that external forces F can be exerted on the spring.

The mass of elastomer 3 is contained under pressure inside the tubular envelope 1, from which it is isolated by the casing 5; said mass fills the entire internal volume spreading on either side of the core 4. The elastomer 3 is an electrically conductive elastomer, obtained by adding a conductive load to a basic elastomer, which latter is selected for its high thermal expansion coefficient. A siloxane, filled with carbon black, such as the master-mixture "RHODORSIL EC 1075 U", produced by the company Rhone-Poulenc, can be used, the composition of this mixture being:

polydimethylmethylvinylsiloxane: 100 parts
carbon black: 50 to 60 parts. This particular electrically conductive elastomer has a resistivity of about 0.75 ohm.cm, which can be either increased or reduced by varying the proportions of carbon black.

The electrical connection made by means of wires 8 between the metal endpieces 2 and an electrical supply source 7, causes an electrical current to pass through the mass of conductive elastomer 3 (envelope 1, casing 5 and core 4 being produced from electrically insulating materials). The electric energy is dissipated therethrough in the form of heat, so that said mass is heated up and as a result expands. And it is possible, by adjusting the electrical current passing through the conductive elastomer to control the elastic reaction of the spring.

For example, if the maximum power to be dissipated into the mass of conductive elastomer 3 is 500 watts under a supply voltage of 220 volts, then said mass must have a resistance of 96.8 ohms. If the length of said mass is 40 cm and its section 2 cm2, the resistivity of the conducting elastomer must then be 4.84 ohm.cm, a value which can be reached by adding a non-conductive elastomer to the product "RHODORSIL" used.

In order to obtain a low interface electrical resistance between the mass of elastomer 3 and each endpiece 2, said endpieces 2 are provided with a conical protuberance 2a projecting inside the elastomer and of which the surface has been either grooved, or serrated or sanded in order to improve its contact surface with the elastomer.

One preferred method for producing a spring such as defined hereinabove is described in the following.

Over an S-bent flexible strip forming the core 4, is fitted a casing 5 whose rubber wall, joined in fluid-tight manner to the metal endpieces 2 by means of circular retainer rings 10, forms with said endpieces a fluid-tight chamber. The tubular envelope 1 is fitted over the whole assembly and covers the casing 5 and endpieces 2. Said envelope is formed of a plurality of tubular elements juxtaposed with respect to one another, which elements are made of woven fibers which are subsequently impregnated with a thermosetting resin.

When the mechanical connection sleeves 6 have been fitted on the endpieces 2, the whole assembly is placed in a mold where said fluid-tight chamber is inflated with compressed air blown in through one of the endpieces 2 via a tube 11 screwed into the endpiece, a ball valve 12 incorporated to said endpiece and a conduit 13 starting from said valve and issuing in the surface 2a joining the endpiece and the mass of elastomer 3, whereas the other endpiece 2 is closed by its ball valve. Then the wall of the envelope 1 is impregnated; the impregnation product, introduced via orifices provided in the aforesaid mold, is subsequently subjected to a baking treatment.

The insufflation of compressed air is discontinued and the spring filling conductive elastomer is injected through the same way, and is preferably subjected to a vulcanizing treatment.

As a variant, it is possible to do without the insufflation of compressed air, inflating of said fluid-tight chamber being then performed by injecting the conductive elastomer itself.

According to another embodiment of a hydrostatically compressed spring with conductive elastomer, illustrated in FIGS. 3 and 4, there is no flexible core such as the core 4 used in the previous example. The spring is produced from a sausage 3 of conductive elastomer which is molded into the shape selected for the spring, i.e. a C-shape, rather than an S-shape for practical reasons linked to the embodiment of the tubular envelope described hereinafter.

In this embodiment, the tubular envelope 1 is formed around said sausage 3, after vulcanization, with bands of pre-impregnated fabric. Said bands are applied alternately on the intrados face and on the extrados face of the sausage 3, the borders of each band wrapping over the lateral edges of the sausage. This particular arrangement whereby the number of layers is doubled on the edges with respect to the number corresponding to the intrados and extrados faces, reinforces the envelope 1 in the region of said edges so that it can withstand the shearing stresses which will be particularly high when the spring works. As this leads to a localized extra thickness of the envelope 1, the edges of the sausage 3 are thinned accordingly so that, when all the bands have been placed, the assembly has a cross-section which has the target shape, regular and without any projecting parts, as illustrated in FIG. 4. In practice, the number of bands applied over each face of the sausage 3 is at least three. It will be noted that the envelope 1 produced as above-indicated covers not only the sausage 3, but also the endpieces 2 which are placed on the ends thereof and which are cylindrical with the same cross-section as the sausage 3. Finally, the whole assembly is placed in a mold where the envelope 1 undergoes a baking with a view to hardening the product impregnating the textile bands which constitute it.

The sleeves 6, formed of two complementary parts 6a, 6b are then fitted so as to clamp the ends of the envelope 1 on endpieces 2, and holes are made in the latter in order to allow the passage of screws 14 for assembling together parts 6a and 6b of sleeves 6. It is recommended to fit insulating bushes 15 around the screws 14 to ensure electrical insulation of sleeves 6 with respect to endpieces 2. Said endpieces are, on the other hand, provided on their face 2a in contact with the conductive elastomer, with indentations with a view to obtaining a low electrical resistance junction.

Said endpieces 2 are provided, as in the preceding example, with an internal conduit 13, closable by a ball valve 12. This arrangement makes it possible to add in, if the need arises, either more vulcanized conductive or non-conductive elastomer, or carbon black, in order to adjust the rate of compression of the elastomer in the envelope 1 and its electrical resistivity value. To each endpiece 2 is connected, via a locking screw 16, a conducting wire 8 connecting said endpiece with an electrical power source which, when operated, causes an electrical current to pass through the elastomer 3 and to heat same up by Joule effect.

There is shown in broken lines in FIG. 3, the end of a second spring which is equally C-bent, and identical to the first to which it is connected by the coupling of the contiguous sleeves 6 of two springs. This particular arrangement is useful when the object is to produce an S-spring, such as that illustrated in FIG. 1, with springs produced according to the second embodiment.

As illustrated in FIG. 4, the spring according to FIG. 3 has a bean-shaped incurved cross-section. As a result, the intrados and extrados faces of the spring are portions of surfaces which are substantially spherical and concentric. As a variant illustrated in FIG. 5, it is possible for the cross-section not to be incurved, the intrados and extrados faces being then portions of substantially cylindrical and co-axial surfaces.

What is claimed is:

1. An electrically energized hydrostatically compressed elastomeric spring having a required heating power and being energized by an electrical supply source, comprising:
    (a) a bent tubular closed envelope having a generally flattened cross-sectional configuration and having a deformable and electrically insulating wall throughout;
    (b) a mass of elastomer contained within and filling the interior of said tubular envelope, said elastomer including means for causing same to be electrically conductive throughout its mass and having a resistivity which is compatible with the required heating power and with the characteristics of the electrical supply source;
    (c) said mass of elastomer constituting an electrical resistor which, when connected to the electrical supply source, generates heat by Joule Effect, thereby causing the volume of said mass of elastomer to vary by thermal expansion; and
    (d) means for electrically connecting said mass of elastomer to the electrical supply source.

2. A spring as claimed in claim 1, wherein said conductive elastomer is a non-conductive basic elastomer into which a load of conductive substance has been incorporated.

3. A spring as claimed in claim 2, wherein said basic elastomer is of siloxane type and said conductive load is carbon black.

4. A spring as claimed in claim 1, wherein the resistivity of said conductive elastomer ranges between 1 and 10 ohm.cm.

5. A spring as claimed in claim 1, wherein metal endpieces close the ends of said tubular envelope and constitute said means for electrically connecting said mass of conductive elastomer to the electrical supply source, a portion of each said endpiece being in contact with said elastomer, said portion having a rough surface texture.

6. A spring as claimed in claim 1, wherein said bent tubular envelope has intrados and extrados faces which constitute portions of substantially cylindrical and coaxial surfaces.

7. A spring as claimed in claim 1, wherein said bent tubular envelope has intrados and extrados faces which constitute portions of substantially spherical and concentric surfaces.

8. Method for producing a hydrostatically compressed elastomeric spring, comprising the steps of:
    (a) fitting a tight deformable tubular casing over a bent generally flat electrically insulating core;
    (b) fixing endpieces onto the ends of the core, and connecting said endpieces in fluid-tight relation to said tubular casing;
    (c) fitting a tubular envelope made of braided fibers over said tubular casing, with the ends of said envelope respectively covering said endpieces;
    (d) positioning mechanical connection sleeves on said endpieces so as to clamp and close the ends of said tubular envelope;
    (e) placing the assembly made from steps (a) through (d) above in a mold and inflating said tubular casing via a conduit formed through one of said endpieces;
    (f) impregnating said tubular envelope with a hardening impregnation product by introducing same through said mold, and thereafter subjecting said assembly to a baking treatment to harden said imprégnation product within the wall of said tubular envelope; and
    (g) filling the interior of said casing by injecting a mass of electrically conductive elastomer through said conduit in one of said endpieces.

9. The method described in claim 8, including the step of vulcanizing said elastomer which is injected into said tubular casing.

10. The method described in claim 8, wherein said step of inflating said tubular casing comprises blowing in auxiliary compressed air through said conduit.

11. A method for producing a hydrostatically compressed elastomeric spring as defined by claim 8, wherein said step of inflating said tubular casing comprises the step of injecting said filling mass of electrically conductive elastomer into said tubular casing via said conduit.

12. Method for producing a hydrostatically compressed elastomeric spring, comprising the steps of:
    (a) molding a mass of electrically conductive vulcanized elastomer into an elongated structure which has a bent shape required for a spring, and has a generally flattened cross-section with generally thinner lateral edge portions joining intrados and extrados faces of said elongated structure;,
    (b) placing metal endpieces having a crosssectional configuration substantially identical to the cross-sectional configuration of said elongated structure onto the ends of said structure;

(c) forming a tubular envelope around said elongated structure and said endpieces by applying bands of fabric pre-impregnated with a hardening impregnation product alternately on said intrados and extrados faces of said elongated structure and endpieces in overlapping relation, such that the lateral borders of said bands are folded over said lateral edges in such a way as to cover said lateral edges closely;

(d) baking the impregnated structure formed in steps (a) through (c) above in a mold to harden the impregnation product within said bands of fabric; and (e) placing mechanical connection sleeves around the ends of said envelope covering said endpieces so as to clamp and close the ends of said tubular envelope.

13. A method for producing a hydrostatically compressed elastomeric spring as defined by claim 12, including the step of adding a complement of non-conductive elastomer by injection thereof into said envelope through one of said endpieces in order to adjust the rate of compression of the elastomer within said tubular envelope.

14. A method for producing a hydrostatically compressed elastomeric spring as defined by claim 12, including the step of adding a complement of conductive elastomer within said tubular envelope by injection thereof into said envelope through one of said endpieces.

15. A method for producing a hydrostatically compressed elastomeric spring as defined by claim 12, including the step of adding a complement of electrical-resistivity-increasing material into said tubular envelope by injection thereof into said envelope through one of said endpieces.

16. An electrically energized hydrostatically compressed elastomeric spring having a required heating power and being energized by an electrical supply source, comprising:

(a) a bent tubular closed envelope having a generally flattened cross-sectional configuration and having a deformable and electrically insulating wall throughout;

(b) a mass of elastomer contained within and filling the interior of said tubular envelope, said elastomer including means for causing same to be electrically conductive and having a resistivity which is compatible with the required heating power and with the characteristics of the electrical supply source;

(c) said mass of elastomer constituting an electrical resistor which, when connected to the electrical supply source, generates heat by Joule Effect, thereby causing the volume of said mass of elastomer to vary by thermal expansion;

(d) means for electrically connecting said mass of elastomer to the electrical supply source, comprising metal endpieces which close the ends of said tubular envelope, wherein a portion of each said endpiece is in electrical contact with said elastomer, said portion having a rough surface texture; and (e) said tubular envelope is substantially elliptically shaped in cross section and contains a flat central core produced of an electrically insulating flexible material, which extends longitudinally from one said endpiece to the other, and extends transversely throughout substantially the entire major cross-sectional axis of the flattened, substantially elliptically shaped section of said envelope, said core being fixed by its ends to said endpieces.

* * * * *

UNITED STATES PATENT AND TRADEMARK OFFICE
CERTIFICATE OF CORRECTION

PATENT NO. : 4,932,637
DATED : June 12, 1990
INVENTOR(S) : Jacques H. Jarret

It is certified that error appears in the above-identified patent and that said Letters Patent is hereby corrected as shown below:

Column 1, Line 38, delete "this" and substitute therefor --thus--.

Column 1, Line 51, delete "and" and substitute therefor --each--.

Column 6, Line 65, delete "crosssectional" and substitute therefor --cross-sectional--.

Signed and Sealed this

Twenty-first Day of May, 1991

Attest:

HARRY F. MANBECK, JR.

Attesting Officer

Commissioner of Patents and Trademarks